United States Patent [19]

Simons

[11] Patent Number: 5,101,960
[45] Date of Patent: Apr. 7, 1992

[54] CONVEYANCE APPARATUS AND RELATED METHOD OF OPERATION

[75] Inventor: Robert L. Simons, San Dimas, Calif.

[73] Assignee: Lucas Western, Inc., Brea, Calif.

[21] Appl. No.: 594,375

[22] Filed: Oct. 9, 1990

[51] Int. Cl.⁵ .............................................. B65G 47/26
[52] U.S. Cl. ..................................... 198/457; 198/787
[58] Field of Search ............... 198/414, 416, 457, 782, 198/787

[56] References Cited

U.S. PATENT DOCUMENTS

| | | | |
|---|---|---|---|
| 2,897,948 | 8/1959 | Cranston, Jr. | 198/414 X |
| 3,100,039 | 8/1963 | Oderman et al. | 198/414 |
| 3,295,660 | 1/1967 | Nelson . | |
| 3,442,410 | 5/1969 | Solomonson | 198/414 X |
| 4,047,622 | 9/1977 | Blessing . | |
| 4,201,284 | 5/1980 | Brems . | |
| 4,437,560 | 3/1984 | Wolf | 198/457 |
| 4,457,419 | 7/1984 | Ogami et al. | 198/414 X |
| 4,589,542 | 5/1986 | Steadman . | |
| 4,591,046 | 5/1986 | Toste, Jr. et al. | 198/457 |
| 4,696,386 | 9/1987 | Lem | 198/782 X |
| 4,756,521 | 7/1988 | Martin | 198/457 X |

*Primary Examiner*—D. Glenn Dayoan
*Attorney, Agent, or Firm*—Pretty, Schroeder, Brueggemann & Clark

[57] ABSTRACT

A system for conveying heavy loads or pallets that includes a conveyor device and a frictional pivot device for rotating these loads. The pivot device has a normal position below the conveyance plane, out of contact with a load, and is moved towards into frictional engagement with the load so as to form a pivot axis, the load being continually supported by the conveyor device. The conveyor device then drives the load, which is pinned at the pivot axis, such that the load is pivoted. When the desired rotation is achieved, the pivot device is lowered so that the load may be moved away.

35 Claims, 2 Drawing Sheets

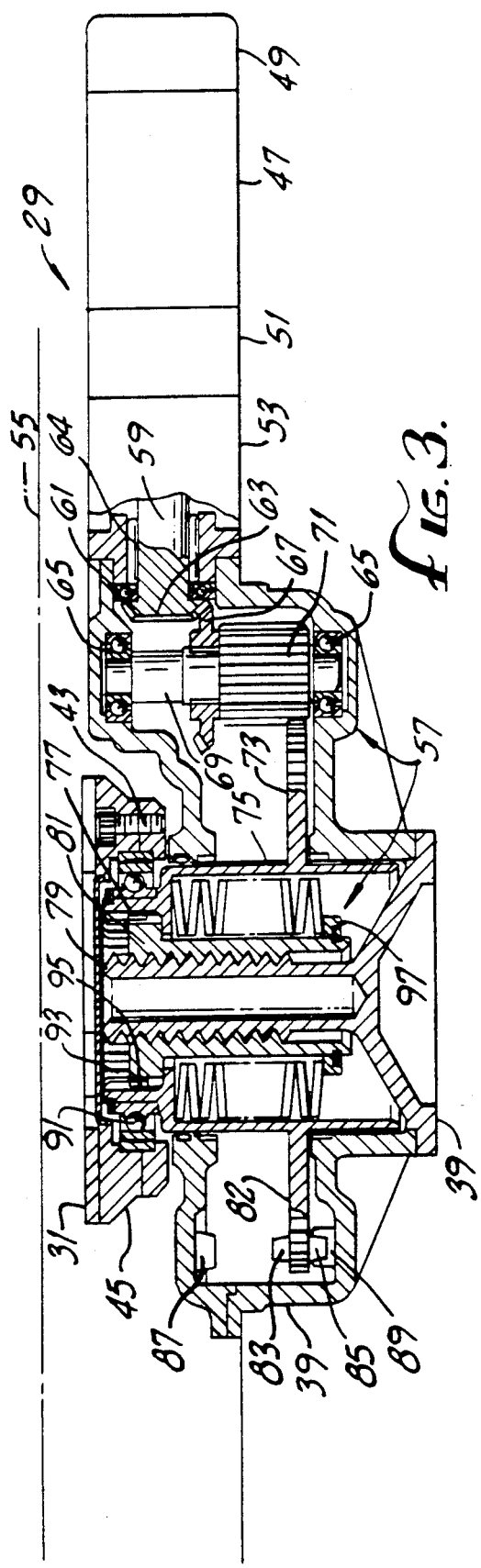

CONVEYANCE APPARATUS AND RELATED METHOD OF OPERATION

BACKGROUND OF THE INVENTION

This invention relates generally to the conveyance of heavy loads such as cargo containers and pallets and, more particularly, to an apparatus and a method for pivoting or turning these loads while they are being conveyed.

In conveyance systems, it is often necessary to pivot conveyed loads such that the loads are presented with a particular orientation. Typically, these conveyance systems include a plurality of freely-rotating bearings for supporting the loads and a plurality of powered roller drive mechanisms for propelling the loads. These drive mechanisms are normally located below a conveyance plane defined by the support bearings, but have rollers which are selectively movable to a position proximate to the conveyance plane for frictionally engaging and propelling the loads. The powered roller drive mechanisms are generally fixed in orientation and are capable of propelling loads in either of two directions. In order that the loads may be automatically conveyed, the powered roller drive mechanisms are generally located at uniform intervals such that loads encounter a new drive mechanism's roller upon leaving an old one and thus experience continuity of motion. Likewise, the support bearings are generally uniformly distributed such that the loads are evenly supported by them.

An exemplary use of a conveyance system of this type is in the loading of heavy loads aboard an aircraft. A load positioned outside the cargo door is supported by freely rotating bearings on a system aligned with a conveyance system in the aircraft. A self-lifting, powered drive mechanism may be activated, lifting its roller into frictional engagement with the bottom surface of the load and then rotating so as to propel the load into the aircraft. In order that this frictional engagement may be provided, it is necessary that the drive mechanism apply a normal force to the load's bottom surface. The load, however, remains supported primarily by the support bearings. When inside the aircraft, the load is similarly supported by bearings and is engaged by self-lifting powered drive mechanisms which propel the load along a first conveyance path, further into the aircraft. When the load has been propelled sufficiently far into the aircraft, the drive rollers are deactivated and retracted below the plane of support formed by the bearings. A second set of self-lifting powered drive mechanisms then engages the load and moves it longitudinally within the aircraft, along a second conveyance path, to a position where it may be secured for flight. The second set of drive mechanisms typically is mounted with a fixed orientation perpendicular to that of the first set of drive mechanisms In some instances, the load must have a particular orientation within the aircraft. For example, the load may have a shape that necessitates a particular orientation for optimal use of space. Also, aircraft cargo systems must handle oversized cargo pallets which weigh in excess of 25,000 pounds and which have greater lengths than either the aircraft door or the aircraft interior widths. Therefore, it is necessary to load these pallets lengthwise through the door and to pivot the pallets such that they may fit longitudinally within the aircraft's cargo hold.

Generally, in pivoting or turning loads in conveyance systems, a bar is used as a fulcrum for jostling the loads back and forth until the turn is complete. This method of pivoting the loads is both labor and time intensive. In addition, the fulcrum may dent or otherwise damage the loads, pallets or aircraft structure.

Some conveyance systems use instead rotatably-mounted power rollers or wheels. However, these often require a substantial amount of space below the conveyance plane, creating both undesirable design constraints and maintenance and cleaning problems. Frequently, the depth required for such a system's installation is unavailable or too costly to utilize. In addition, such systems do not provide for positive, safe control of the load.

It should therefore be appreciated that there is a need for a powered system for efficiently turning loads such as cargo and pallets which can be installed in existing conveyance systems without extensive alteration and which has a relatively low profile to facillitate maintenance and cleaning. The current invention satisfies this need and provides an efficient, useful conveyance system.

SUMMARY OF THE INVENTION

The current invention provides an improved apparatus and method for conveying heavy loads, such as cargo containers and pallets, using pivot means that selectively pins the loads as they are being conveyed along a conveyance path by conveyor means, thereby turning the loads on the conveyor means. Thus, the load may be efficiently mechanically turned without extensive manual labor. Moreover, the pivot means can be incorporated into existing conveyance systems without requiring substantial alteration to the systems and without requiring substantial maintenance.

In accordance with the invention, the pivot means is mounted in a location along the conveyor means where it is desired to turn the load, normally beneath a plane of conveyance defined by the conveyor means. Lift means selectively lifts the pivot means from below the plane of conveyance into contact with the load, to apply a frictional restraint to the load, and subsequently selectively lowers the pivot means out of contact with the load after the load has been turned to a desired orientation.

The lift means may be advantageously constructed so as to retain a shallow profile yet be capable of supplying sufficient force to the pivot means for frictionally pinning very heavy loads. As an optional feature of the invention, the lift means may include movement and force limitation means for ensuring that the pivot will not dent very heavy loads with malleable exteriors.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 3 is a cross-sectional plan of the pivot device, taken in the direction of arrows 3—3 in FIG. 2, and shown with an engagement plate in a retracted state and a plane of conveyance in dotted lines.

FIG. 4 is a plan of the pivot device of FIG. 3, with the engagement plate in frictional engagement with a load, shown in dotted lines.

DESCRIPTION OF THE PREFERRED EMBODIMENT

Figure 1:
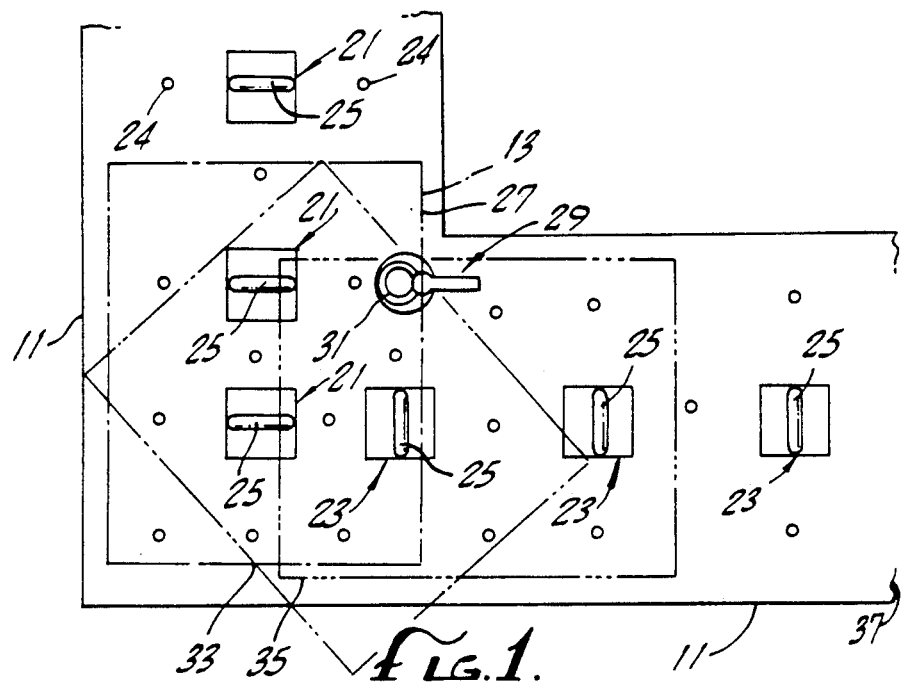
FIG. 1 is a plan of a conveyance apparatus having two sets of power rollers for moving a load in two directions, a pivot device for pivoting the loads at a point in a conveyance path, and showing in dotted lines the progress of a load being pivoted.

As shown in the exemplary drawings, and particularly FIG. 1, the present invention is embodied in a conveyance apparatus for moving a load 13 along a generally L-shaped conveyance path 11. The load first enters the conveyance path at the upper end of the figure, where it is supported by freely-rotating support bearings 24 such that it can be moved freely in any horizontal direction. Two groups of self-lifting power drive units 21 and 23, one group for each leg of the L-shaped conveyance path, are provided to propel the load along the conveyance path. Together, the freely-rotating support bearings and the self-lifting power drive units form a plane of conveyance 55 along which the load is moved.

When the load 13 first enters the conveyance path 11, the first group of power drive units 21 mechanically lift drive rollers 25 into engagement with the load. Encountering resistance to further lifting of the rollers, the power drive units overcome the rollers' threshold resistance and forwardly rotate the rollers to propel the load towards the bend in the L-shaped conveyance path. When the load reaches the position in the conveyance path indicated by broken lines 27, a pivot device 29, located at the interior of the bend in the path, raises into engagement with the load so that the load can be pivoted about the pivot device and thereafter propelled along the second leg of the path.

The pivot device 29 includes an engagement plate 31 for frictionally contacting the bottom surface of the load 13 and for effectively pinning the load at that point. Continued operation of the first group of drive units 21 thereby pivots the load about the engagement plate, as shown by the broken lines 33. When the load reaches an orientation indicated by the numeral 35, the pivot device retracts the engagement plate, either under a positive force or gravitationally, out of frictional engagement with the load. The second group of drive units 23 then can propel the load along the conveyance path in the same manner as described above for the first group of drive units 21. Eventually, the load will exit the conveyance path at the right of the figure.

Figure 2:
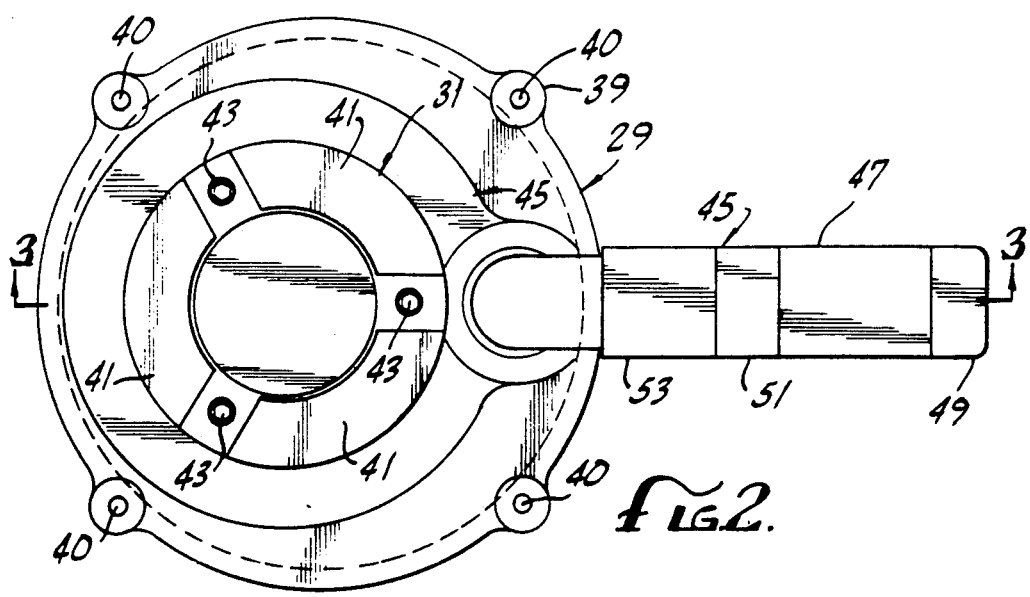
FIG. 2 is an enlarged plan of the pivot device of the conveyance apparatus of FIG. 1.

The pivot device 29 is shown in additional detail in FIG. 2. The engagement plate 31 is lifted into frictional engagement with the load 13 by a motor 47, which is coupled to the plate through a torque limiter 45 and a gear reduction unit 51. The torque limiter limits the rotational energy provided by the motor when the engagement plate reaches the limit of its range of motion, and the gear reduction unit multiplies the force provided by the motor such that the engagement plate is raised with sufficient force to frictionally interact with all loads. The motor also is coupled to a motor brake 49, so that the motor may be quickly stopped if desired. The pivot device 29 further includes fixed a support 39 that is anchored to the conveyance apparatus by a set of bolts 40.

The engagement plate 31 has three friction pads 41 for frictionally engaging the bottom surface of the load 13. Underlying the engagement plate is a rotatably-mounted base 45 which is adapted to interface between the engagement plate and the gear reduction unit 51 such that the engagement plate may be freely rotated at all times. Thus, although the engagement plate effectively pins the load, it does not inhibit the load from pivoting about the plate's vertical axis. The engagement plate is mounted to the rotatably-mounted base by three bolts 43, which lie circumferentially between the friction pads.

The engagement plate 31 is initially in a retracted position, as shown in FIG. 3. When the engagement plate is to be lifted, the motor 47 is turned on. The shaft of the motor is coupled through the torque limiter 45 to an input shaft 59 of the gear reduction unit 51. The torque limiter ceases to transmit the motor's rotational energy when the engagement plate is fully extended upwardly towards the load. The gear reduction unit amplifies the motor's force of rotation by reducing the rate of angular rotation, thus enabling the engagement plate to apply a lifting force sufficient to frictionally pin a heavy load. The rotational output of the gear reduction unit is transferred through its output shaft 75 to the force conversion unit 57, which jacks up the output shaft and the engagement plate, towards the load 13. The engagement plate thereby rises and contacts the bottom surface of the load. The output shaft continues rising until it has moved through its range of motion, at which time it is physically restrained from rotating further. Encountering this resistance, the torque limiter limits the force supplied to the input shaft 59 to the gear reduction unit 51, and maintains the engagement plate at its extended position.

Rotational energy is imparted to the gear reduction unit 51 through its input shaft 59, which is rotatably supported by a thrust bearing 61 and a rolling-contact bearing 64. The input shaft terminates in a beveled pinion gear 63, which meshes with a bevel gear 67 of larger diameter. The bevel gear rotates a vertically-oriented intermediate shaft 69, which is supported by two sets of rolling-contact bearings 65. The relatively larger diameter of the bevel gear provides a decreased rotation rate for the intermediate shaft, as compared to the motor's rotation rate, with increased torque. The intermediate shaft supports a spur pinion gear 71, which meshes with a spur gear 73 of the gear reduction unit's output shaft 75, thus transferring the rotational energy of the intermediate shaft to the vertical output shaft. This spur gear is of larger diameter than the spur pinion, such that the output shaft rotates at a still lower angular rate than does the intermediate shaft, with further increased torque.

The output shaft 75 of the gear reduction unit 51 is a top hat-shaped hollow cylinder 77 having a horizontal ledge 82 that supports the spur gear 73. Two flanges are located at the ledge's periphery, one flange 83 extending vertically upwardly, for contacting a mechanical extend stop 87 of the fixed support 39, and the other flange 85 extending vertically downwardly, for contacting a mechanical retract stop 89 of the fixed support. The upper end of the output shaft's cylinder 77 supports the engagement plate 31 and the rotatably-mounted base 45 via a rolling contact bearing 91, which allows the base and plate to freely rotate with respect to the output shaft.

Within the output shaft's upper end is an internal spline 93 that drives the force conversion unit 57, for converting the output shaft's rotation into linear movement to raise the engagement plate 31. The force conversion unit includes an acme screw 79 and an acme nut 81. The acme screw is mounted to the fixed support 39, whereas the acme nut 81 moves vertically relative to the acme screw, for jacking up the output shaft and the engagement plate upwardly toward the load. Rotational energy that causes the acme nut to rise vertically is imparted to an exterior spline 95 located on the acme nut's upper exterior by the internal spline located on the interior of the output shaft's hollow cylinder 77. In an alternative embodiment of the invention, the force conversion unit may include another type of jack screw such as a ball screw for use in the same manner as the acme screw.

When the engagement plate 31 has reached the limit of its range of motion, the output shaft 75 of the gear reduction unit 57 is restrained from further vertical movement. As the engagement plate is raised towards the load 13, the output shaft rises also. Eventually, the flange 83 located on the upper side of the output shaft's ledge 82 reaches the mechanical extend stop 87, to prevent further rotation of the output shaft. As mentioned above, the torque limiter 45, which in the preferred embodiment is a spring loaded roller-thrust bearing, dumps the motor's rotational energy by failing to transfer it to the gear reduction unit 57. Likewise, when the engagement plate retracts from the load, the flange 85 on the lower side of the output shaft's ledge contacts a mechanical retract stop 89, restraining further rotation of the output shaft in the opposite direction.

Both a preloaded spring pack 97 and the mesh between the exterior spline 95 of the output shaft 75 and the internal spline 93 of the force conversion unit 57 couple the output shaft of the gear reduction unit to the force conversion unit. It will be observed in FIG. 3 that the acme nut 81 is normally spaced from the engagement plate 31, along the juncture of the internal spline 93 and the exterior spline 95. Thus, the acme nut 81 is normally offset from the output shaft's upper end. If the engagement plate 31 contacts a load whose weight exceeds the spring pack's preload value, then as the acme nut 81 rises, the output shaft does not correspondingly rise, having its upward movement limited by the spring pack's compression. Thus, the acme nut moves vertically relative to the output shaft, along their joint axis of rotation. The engagement plate therefore does not cover its full range of vertical movement, as it otherwise might with a lighter load or with no load at all.

As should be apparent from the foregoing, the system is shallow in profile and does not rise significantly above the conveyance plane. Further, the system operates mechanically and enables the pivoting of loads without substantial manual labor, inefficient jogging of the load, or expensive modifications to existing conveyance systems. Thus, the current invention presents an efficient apparatus and method for manipulating and conveying loads.

While a particular form of the invention has been illustrated and described, it will be apparent that various modifications can be made without departing from the spirit and scope of the invention. Further, the description set out above is merely the preferred example of the invention and does not limit the invention as it is fully claimed below.

I claim:

1. A conveyance apparatus comprising:
   conveyor means for advancing a conveyance load along a conveyance path;
   pivot means located in the conveyance path and having an engagement plate, the pivot means being selectively movable along a pivot axis; and
   lift means for selectively moving the pivot means along the pivot axis into engagement with the load such that the conveyor means pivots the conveyance load about the pivot axis.

2. The apparatus of claim 1, wherein:
   the conveyor means defines a plane of conveyance; and
   the engagement plate of the pivot means is normally located below the plane of conveyance and the conveyance load is located above the plane of conveyance.

3. The apparatus of claim 1, wherein:
   the apparatus further comprises a fixed support that mounts the lift means;
   the engagement plate is mounted so as to freely rotate with respect to the fixed support about the pivot axis; and
   the lift means includes limiting means for limiting an engagement force applied to the conveyance load by the pivot means and for limiting movement of the engagement plate to a specific range, the limiting means being operatively coupled between the fixed support and the engagement plate.

4. A method for pivoting a conveyance load about a vertical axis as the load is being propelled along a plane of conveyance, comprising the steps of:
   moving the conveyance load along the plane of conveyance to a position where it intersects a pivot axis defined by a rotatably-mounted engagement plate located on a side of the plane of conveyance opposite the conveyance load;
   moving the rotatably-mounted engagement plate along the pivot axis and into frictional engagement with the conveyance load, to pin the load at the pivot axis without removing the load from the plane of conveyance;
   pivoting the conveyance load about the pivot axis; and
   moving the rotatably-mounted engagement plate out of frictional engagement with the conveyance load, such that the load is no longer pinned at the pivot axis.

5. The method of claim 4, wherein:
   the step of moving the engagement plate into frictional engagement with the load includes a step of moving the engagement plate from below the plane of conveyance; and
   the step of moving the engagement plate out of frictional engagement with the load includes a step of moving the engagement plate below the plane of conveyance.

6. The method of claim 4, wherein the step of pivoting the conveyance load includes a step of advancing the load using a powered conveyor means that engages the load at locations spaced from the engagement plate.

7. A conveyance apparatus comprising:
   first conveyor means defining a first conveyance path;
   second conveyor means defining a second conveyance path, which intersects the first conveyance path;
   wherein the first and second conveyor means are adapted to convey a load along their respective first and second conveyance paths;

pivot means located at the intersection of the first and second conveyance paths and having an engagement plate selectively movable along a pivot axis into and out of engagement with the load; and lift means for selectively moving the engagement plate into engagement with the load such that one of the first and second conveyor means pivots the load about the pivot axis.

8. The apparatus of claim 7, wherein the lift means includes:

a motor for producing a drive torque; and force conversion means for converting the drive torque into a linear force for moving the engagement plate of the pivot means into and out of engagement with the load, the force conversion means including gear reduction means, coupled between the motor and the engagement plate, for converting the drive torque produced by the motor into a second, increased torque.

9. The apparatus of claim 8, wherein:

the apparatus further comprises a fixed support that mounts the lift means;

the engagement plate is mounted so as to freely rotate with respect to the fixed support, about the pivot axis; and the lift means includes limiting means for limiting an engagement force applied to the conveyance load by the pivot means and for limiting movement of the engagement plate to a specific range, the limiting means being operatively coupled between the fixed support and the engagement plate.

10. The apparatus of claim 9, wherein the limiting means includes a torque limiter that limits the drive torque produced by the motor when the engagement plate reaches an extremity of its range of motion.

11. The apparatus of claim 9, wherein the limiting means includes a mechanical stop for preventing further movement of the engagement plate towards the load.

12. The apparatus of claim 8, wherein the force conversion means includes jack means that is operatively coupled to the motor and connected to the engagement plate so as to impart to it linear motion.

13. The apparatus of claim 12, wherein the jack means includes an acme screw.

14. A conveyance apparatus comprising:

first conveyor means defining a first conveyance path;

second conveyor means defining a second conveyance path, which intersects the first conveyance path;

wherein the first and second conveyor means are adapted to convey a load along their respective first and second conveyance paths;

pivot means located at the intersection and having an engagement plate selectively movable along a pivot axis into and out of engagement with the load;

lift means for selectively moving the engagement plate into engagement with the load such that one of the first and second conveyor means pivots the load about the pivot axis, the lift means including limiting means for limiting an engagement force applied to the load by the engagement plate and for limiting movement of the engagement plate to a specific range; and a fixed support that mounts the lift means.

15. The apparatus of claim 14, wherein the limiting means includes a spring pack adapted to be compressed only when the load exceeds a predetermined weight, the spring pack being operatively engaged between the pivot means and the fixed support.

16. The apparatus of claim 14, wherein:

the lift means includes a motor for producing a drive torque;

force conversion means for converting the drive torque into a linear force for moving the engagement plate of the pivot means into and out of engagement with the load; and the limiting means includes a torque limiter that limits the drive torque produced by the motor when the engagement plate reaches an extremity of its range of motion.

17. The apparatus of claim 16, wherein:

the force conversion means includes gear reduction means, coupled between the motor and the engagement plate, for converting the drive torque produced by the motor into a second, increased torque, and a jack screw connected between the engagement plate and the gear reduction means, the jack screw having a flange for contacting a mechanical stop;

the limiting means includes at least one mechanical stop for contacting the flange and for retarding further movement by the pivot means, the mechanical stop being attached to the fixed support; and wherein the torque limiter is responsive to the mechanical stop being contacted by the flange so as to reduce the drive torque applied by the motor when the flange contacts the mechanical stop.

18. A conveyance apparatus comprising:

first conveyor means defining a first conveyance path;

second conveyor means defining a second conveyance path, which intersects the first conveyance path;

wherein the first and second conveyor means are adapted to convey a load along their respective first and second conveyance paths;

a support;

a rotatably-mounted engagement plate for frictionally engaging a load;

an output gear rotatably mounting the engagement plate, the output gear having a first spur track and a second spur track;

a jack screw having a spur gear operatively connected to the first spur track of the output gear, and the jack screw coupled to the support, the jack screw adapted so as to urge the output gear to move linearly selectively towards the load or away from the load;

a motor having a rotational speed, the motor operatively coupled to the output gear; and gear reduction means operatively coupling the output gear at the second spur track and the motor so as to drive the output gear at a lesser rotational speed that than the rotational speed of the motor.

19. The apparatus of claim 18, further comprising:

a mechanical extend stop fixedly mounted to the support;

a mechanical retract stop fixedly mounted to the support;

a motor brake coupled to the motor that stops the motor within a repeatable range once the motor is deenergized;

a first flange connected to the output gear for contacting the mechanical extend stop when the output gear is urged to move towards the load beyond a high end of a selected range of motion;

a second flange connected to the output gear for contacting the mechanical retract stop when the output gear is urged to move beyond a low end away from the load of the selected range of motion; and spring means coupled between the jack screw and the output gear, the spring means being compressed when the load exceeds a predetermined weight such that a linear force of the jack screw towards the load is limited by the spring means.

20. The apparatus of claim 18, wherein the jack screw comprises a male member and a female member in threaded engagement and wherein the output gear is coupled to one of the male member and the female member and the other of the male member and the female member is coupled to the support, the male member rotatable with respect to the female member so as to be displaceable along the axis of rotation with respect to the female member.

21. A method for pivoting a conveyance load about a vertical axis as the load is being propelled along a plane of conveyance, comprising the steps of:

moving the conveyance load along the plane of conveyance to a position where it intersects a pivot axis defined by a rotatably-mounted engagement plate located on a side of the plane of conveyance opposite the conveyance load;

moving the rotatably-mounted engagement plate towards the plane of conveyance from a location below the plane of conveyance along the pivot axis and into frictional engagement with the conveyance load, to pin the load at the pivot axis without removing the load from the plane of conveyance;

pivoting the conveyance load about the pivot axis by advancing the load by engaging the load at locations spaced from the engagement plate; and moving the rotatably-mounted engagement plate out of frictional engagement with the conveyance load, such that the load is no longer pinned at the pivot axis.

22. The method of claim 21, wherein the step of moving the rotatably-mounted engagement plate towards the plane of conveyance includes the step of driving a jack which is coupled to the rotatably-mounted engagement plate so as to move the rotatably-mounted engagement plate towards the plane of conveyance.

23. The method of claim 22, wherein the step of driving a jack includes the step of rotating one of a first threaded member and a second member, which are coupled in threaded engagement, such that the first threaded member is displaced along the axis of rotation with respect to the second member.

24. A conveyance apparatus comprising:

conveyor means for advancing a conveyance load along a conveyance path;

pivot means located in the conveyance path and having an engagement plate, the pivot means being selectively movable along a pivot axis; and lift means for selectively moving the pivot means along the pivot axis into engagement with the load such that the conveyor means pivots the conveyance load about the pivot axis, the lift means including a motor for producing a drive torque and force conversion means for converting the drive torque into a linear force for moving the engagement plate of the pivot means into engagement with the load, the force conversion means including gear reduction means, coupled between the motor and the engagement plate, for converting the drive torque produced by the motor into a second, increased torque.

25. The apparatus of claim 24, wherein the force conversion means includes a male member and a female member that are displaced with respect to each other along their cylindrical axis when the pivot means is moved along the pivot axis.

26. The apparatus of claim 25, wherein the male member and female member comprise a jack and are coupled in threaded engagement, and wherein one of the male and female members is coupled between the gear reduction means and the pivot means, so as to receive the increased torque from the gear reduction means and to rotate with respect to the other of the male and female members and to displace the engagement plate along the pivot axis, the male member being displaced by the rotation along the axis of rotation with respect to the female member.

27. The apparatus of claim 26, wherein the lift means includes limiting means for limiting an engagement force applied to the conveyance load by the pivot means and for limiting movement of the engagement plate to a specific range, the limiting means being operatively coupled between the engagement plate and the jack.

28. The apparatus of claim 27, wherein the limiting means includes a spring pack adapted to be compressed only when the load exceeds a predetermined weight, the spring pack being operatively engaged between the pivot means and the motor.

29. The apparatus of claim 27, wherein the limiting means includes a torque limiter that limits the drive torque produced by the motor when the engagement plate reaches an extremity of its range of motion.

30. The apparatus of claim 29, wherein the limiting means includes a mechanical stop for preventing further movement of the engagement plate towards the load.

31. The apparatus of claim 24, wherein the conveyance path is non-linear and the pivot means defines a pivot axis positioned at a bend in the conveyance path.

32. The apparatus of claim 1, wherein the pivot means is moved into engagement with the load substantially in the plane of conveyance.

33. The apparatus of claim 1, wherein the pivot means is moved into engagement with a single side of the load.

34. The apparatus of claim 1, wherein the lift means selectively moves the pivot means into engagement with the load such that the conveyor means substantially provides all of the impetus to pivot the conveyance load about the pivot axis and the pivot means supplies substantially no rotational impetus to pivot the load.

35. The method of claim 4, wherein the step of moving the rotatably-mounted engagement plate along the pivot axis and into frictional engagement with the conveyance load includes the step of engaging the conveyance load substantially within the plane of conveyance.

* * * * *